(12) United States Patent
Miller

(10) Patent No.: US 12,281,749 B2
(45) Date of Patent: Apr. 22, 2025

(54) ADAPTOR FOR AN ELECTRICAL BOX

(71) Applicant: David D. Miller, Grafton, OH (US)

(72) Inventor: David D. Miller, Grafton, OH (US)

( * ) Notice: Subject to any disclaimer, the term of this patent is extended or adjusted under 35 U.S.C. 154(b) by 0 days.

(21) Appl. No.: 17/978,497

(22) Filed: Nov. 1, 2022

(65) Prior Publication Data

US 2024/0142047 A1    May 2, 2024

(51) Int. Cl.
*H02G 3/08*      (2006.01)
*F16M 13/02*    (2006.01)

(52) U.S. Cl.
CPC ............. *F16M 13/02* (2013.01); *H02G 3/081* (2013.01); *H02G 3/086* (2013.01)

(58) Field of Classification Search
CPC ..... H02G 3/086; H02G 3/081; Y10S 248/906
USPC .................. 174/50, 58; 439/535; 248/906
See application file for complete search history.

(56) References Cited

U.S. PATENT DOCUMENTS

| | | | | |
|---|---|---|---|---|
| 4,569,458 A * | 2/1986 | Horsley | ................. | H02G 3/125 220/3.9 |
| 5,224,673 A * | 7/1993 | Webb | ..................... | H02G 3/128 220/3.9 |
| 5,931,325 A * | 8/1999 | Filipov | ................... | H02G 3/081 220/3.7 |
| 6,066,803 A * | 5/2000 | Hagarty | ................. | H02G 3/081 174/58 |
| 7,531,743 B2 | 5/2009 | Johnson et al. | | |
| D738,317 S | 9/2015 | Hagarty | | |
| 10,027,099 B1 | 7/2018 | Garvin | | |
| 2002/0157850 A1* | 10/2002 | Vrame | ................... | H02G 3/123 174/58 |
| 2005/0082078 A1* | 4/2005 | Dinh | ...................... | H02G 3/123 174/58 |
| 2018/0109082 A1* | 4/2018 | Garvin | ................... | H02G 3/081 |

* cited by examiner

*Primary Examiner* — Alfred J Wujciak
(74) *Attorney, Agent, or Firm* — Curatolo Sidoti & Trillis Co., LPA; Floyd Trillis, III; Salvatore A. Sidoti

(57) ABSTRACT

An adaptor configured to be coupled to a square electrical box, the adaptor comprising: a base having a first base surface, a second base surface, an outer perimeter, and an opening extending therethrough; a collar defining the opening on the base, wherein the collar has a first collar surface facing the opening and a second collar surface facing the first base surface of the base, wherein the collar comprises four triangular tabs; wherein the first collar surface of the collar has an octagonal dimension; and wherein the second collar surface of the collar has a substantially square dimension.

17 Claims, 8 Drawing Sheets

ADAPTOR FOR AN ELECTRICAL BOX

TECHNICAL FIELD

The present disclosure relates to adaptors that are configured to be coupled to square electrical boxes, such as a 4" or 4¹¹⁄₁₆" electrical box. This disclosure more particularly relates to adaptors that are configured to be coupled to square electrical boxes in any orientation while still being compatible with the mounting pattern of an electrical device having a different configuration, such as light fixtures an octagonal mounting pattern.

BACKGROUND

The National Electric Code (NEC) requires that all wire connections or cable splices be inside an accessible electrical box. Electrical boxes are mounted to wall studs, ceiling joists, or other supporting structure. An electrical box typically comprises a plurality of sides, a back portion, an open front portion, and an inner cavity for housing electrical components. An adaptor may be coupled to the open front portion of an electrical box to provide a mounting surface that is flush with a finished surface, such as drywall or concrete block. The mounting pattern on many electrical devices and light fixtures is not compatible with the mounting pattern of current adaptors for square electrical boxes. In addition, such adaptors generally only provide two points of attachment to electrical devices or fixtures, resulting in an unsatisfactory connection between the two components.

After electrical boxes with attached adaptors are mounted to wall studs, ceiling joists, or other supporting structure, a finished surface such as drywall is attached to the wall studs and ceiling joists. A hole is cut in the drywall to allow access to the electrical box and the resulting drywall "cut-outs" are discarded. The shape of the cut-out opening is meant to match the shape of the collar portion of the adaptor so that no unsightly gaps or openings are visible in the drywall. Even if gaps or openings are patched, which is a time-consuming and tedious process, the patching is still noticeable and aesthetically unpleasant. The shape of the collar of current adaptors for square electrical boxes, such as circular or octagonal, is very difficult to cut in drywall and nearly impossible to cut in concrete block, and also requires patching of gaps or openings in the drywall or concrete block. In the case of concrete block, electricians are typically forced to use an improper adaptor in order to minimize the size of any gaps or openings that would require patching by a bricklayer or mason.

In view of the foregoing, it can be appreciated that there exists a continuing need for new and improved adaptors for square electrical boxes that make the installation of electrical devices or fixtures thereto easier and faster, and requires significantly less clean-up, if any, post-installation.

SUMMARY

Disclosed is an adaptor configured to be coupled to a square electrical box, the adaptor comprising: a base having a first base surface, a second base surface, an outer perimeter, and an opening extending therethrough; a collar defining the opening on the base, wherein the collar has a first collar surface facing the opening and a second collar surface facing the first base surface of the base, wherein the collar comprises four substantially triangular tabs; wherein the first collar surface of the collar has an octagonal dimension; and wherein the second collar surface of the collar has a substantially square dimension.

Also disclosed is a square electrical box assembly comprising i) an electrical box having a plurality of sides, a back portion, an open front portion, and an inner cavity, and ii) an adaptor configured to be coupled to the square electrical box, the adaptor comprising: a base having a first base surface, a second base surface, an outer perimeter, and an opening extending therethrough; a collar defining the opening on the base, wherein the collar has a first collar surface facing the opening and a second collar surface facing the first base surface of the base, wherein the collar comprises four substantially triangular tabs; wherein the first collar surface of the collar has a octagonal dimension; and wherein the second collar surface of the collar has a substantially square dimension; wherein the outer perimeter of the base of the adaptor comprises one or more slots configured to accept one or more fasteners to couple the adaptor to the electrical box.

Also disclosed is a method for coupling an adaptor to a square electrical box in any orientation while still being compatible with the mounting pattern of an electrical device or fixture having a different configuration, wherein the method comprises: coupling the adapter to the electrical box by inserting a fastener into one or more openings on the base of the adaptor that is configured to accept one or more fasteners; wherein the adaptor comprises: a base having a first base surface, a second base surface, an outer perimeter, and an opening extending therethrough; a collar defining the opening on the base, wherein the collar has a first collar surface facing the opening and a second collar surface facing the first base surface of the base, wherein the collar comprises four substantially triangular tabs; wherein the first collar surface of the collar has a octagonal dimension; and wherein the second collar surface of the collar has a substantially square dimension; wherein the outer perimeter of the base of the adaptor comprises one or more slots configured to accept one or more fasteners to couple the adaptor to the electrical box.

DETAILED DESCRIPTION

Figure 1:
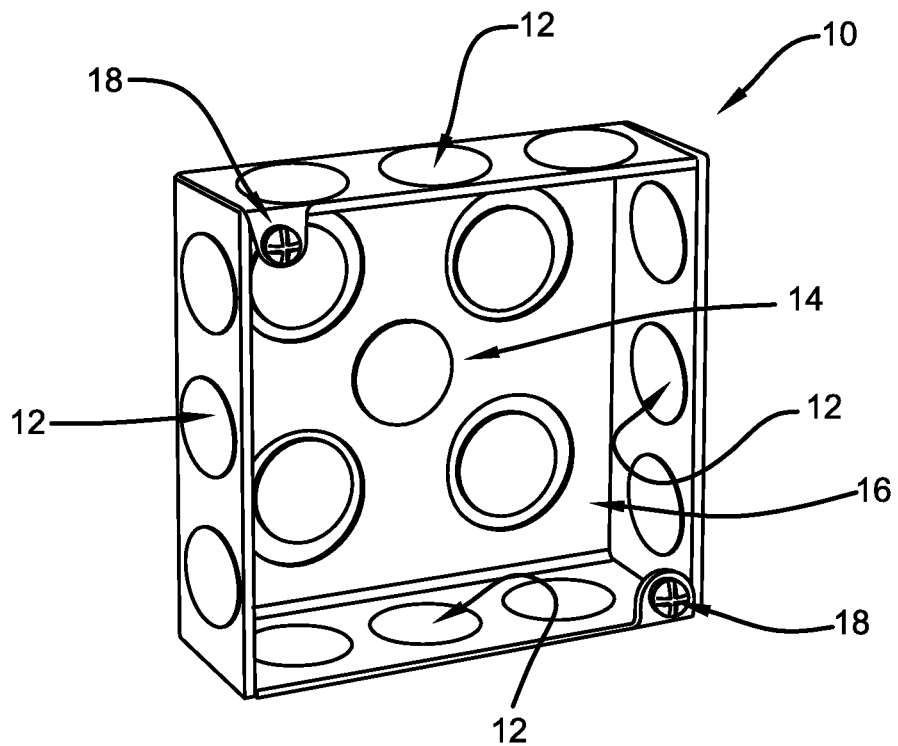
FIG. 1 is a front perspective view of a 4-inch square electrical box.

According to certain embodiments, disclosed is an adaptor configured to be coupled to a square electrical box, the adaptor comprising: a base having a first base surface, a second base surface, an outer perimeter, and an opening extending therethrough; a collar defining the opening on the base, wherein the collar has a first collar surface facing the opening and a second collar surface facing the first base surface of the base, wherein the collar comprises four substantially triangular tabs; wherein the first collar surface of the collar has an octagonal dimension; and wherein the second collar surface of the collar has a substantially square dimension.

According to certain embodiments, at least one of the substantially triangular tabs on the collar comprises at least one opening formed therein for receiving fastening elements to couple the adaptor to an electrical device or fixture. According to certain embodiments, at least two of the substantially triangular tabs on the collar comprises at least one opening formed therein for receiving fastening elements to couple the adaptor to an electrical device or fixture. According to certain embodiments, at least three of the substantially triangular tabs on the collar comprises at least one opening formed therein for receiving fastening elements to couple the adaptor to an electrical device or fixture. According to certain embodiments, each of the four substantially triangular tabs on the collar comprises at least one opening formed therein for receiving fastening elements to couple the adaptor to an electrical device or fixture. In certain embodiments, the openings formed on the triangular tabs of the collar have an 8-32 thread. A substantially triangular dimension as used herein refers a plane figure with three straight sides and three angles as well as shapes that are not a straight edge triangle but resemble a triangular shape.

The adaptor may be comprised of standard materials in the industry including but not limited to metals such as steel, G60 steel, cold rolled steel, stainless steel, or galvanized steel, aluminum or polymers such as ABS, fiberglass, polycarbonate or polystyrene. The adaptor may also be coated with a coating layer selected from the group consisting of: a powder coating layer, a wet paint coating layer, a low-emissivity coating (E-coating) layer, a hot dipped galvanizing layer, a zinc coating layer, and/or a plastic dip coating layer. In certain embodiments, the adaptor is constructed from zinc, pre-coated, steel. In certain embodiments, the adaptor is made of sheet metal that is stamped. In certain embodiments, the base and collar of the adaptor are made as a single unitary member bent or stamped to a desired size and shape.

In certain embodiments, the base of the adaptor has a thickness of from about 0.1 to about 0.3 inches. In certain embodiments, the base of the adaptor has a thickness of about 0.2 inches. In certain embodiments, the base of the adaptor has a dimension of about 4 inches by about 4 inches. In certain embodiments, the base of the adaptor has a dimension of about 4$^{11}/_{16}$ inches by about 4$^{11}/_{16}$ inches.

In certain embodiments, the second collar surface of the adaptor has a dimension of about 3 inches by 3 inches. According to this embodiment, the distance between the openings disposed in opposite diagonal triangular tabs of the collar is about 3½ inches. In certain embodiments, the second collar surface of the adaptor has a dimension of about 2½ inches by 2½ inches. According to this embodiment, the distance between the openings disposed in opposite diagonal triangular tabs of the collar is about 2¾ inches.

According to certain embodiments, the two separate diagonally opposed openings for receiving fastening elements disposed in each triangular tab of the collar of the adaptor makes the installation of electrical devices or fixtures thereto significantly easier and faster. This structure allows for adaptors to be coupled to square electrical boxes in any orientation while still being compatible with the mounting pattern of an electrical device or fixture having a different configuration, such as an octagonal light fixture. In addition, embodiments having four openings for receiving fastening elements disposed in each triangular tab of the collar of the adaptor provides a more secure connection between the adaptor and an electrical device or fixture, provides an increased weight capacity, which is particularly useful for large and heavy wall pack lights that are frequently used in commercial and industrial buildings, and reduces or eliminates wobbling or rocking back-and-forth of the installed electrical device or fixture.

The disclosed adaptor is configured to be coupled to an electrical device or light fixture. Electrical devices may include, but are not limited to, lighting controls, such as occupancy sensors, photosensors, infrared sensors, motion sensors and the like; fire alarm equipment such as smoke detectors and associated alarms; and network interface and audible communication such as routers, wireless access points, speakers and the like. The light fixtures may include, but are not limited to, wall lights, wall sconces, ceiling lights, floor lights and the like.

The first collar surface on the disclosed adaptor has an octagonal dimension which is compatible with the mounting pattern of the majority of electrical devices and fixtures, whereas the second collar surface on the adaptor has a substantially square dimension. The substantially square shape of the second collar surface on the adaptor can be cut out much easier and faster than other shapes, such as circles and octagons, resulting in substantial efficiencies in construction of residential and commercial structures. A substantially square dimension as used herein refers a plane figure with four equal straight sides and four right angles as well as a plane figure with four straight sides and one or more non-right angles. In addition, the "cut-out" from drywall, concrete block, or other material, is significantly smaller, as compared to the cut-out of an adaptor having a circular or octagonal shaped collar. The smaller cut-out results in a snug fit between the collar of the disclosed adaptor and the finished surface, such as drywall or concrete block, with minimal or no gaps or openings that would otherwise require patching. The smaller cut-out produced using the disclosed adaptor also reduces jobsite waste, which is particularly advantageous for drywall disposal which requires hazardous waste management due to its ability to create hydrogen sulfide, which can be toxic depending on the amount inhaled and for how long. In certain embodiments, the adaptor is configured to be installed in an opening on a finished surface, such as drywall or concrete block, that is 25% smaller, as compared to an opening that is required when using an adaptor having a circular or octagonal shaped collar.

In certain embodiments, the outer perimeter of the base of the adaptor comprises one or more slots configured to accept one or more fasteners to couple the adaptor to the electrical box. In certain embodiments, the outer perimeter of the base of the adaptor comprises at least two slots configured to accept one or more fasteners to couple the adaptor to the electrical box. In certain embodiments, the outer perimeter of the base of the adaptor comprises at least three slots configured to accept one or more fasteners to couple the adaptor to the electrical box. In certain embodiments, the outer perimeter of the base of the adaptor comprises at least four slots configured to accept one or more fasteners to couple the adaptor to the electrical box. In certain embodiments, the one or more slots positioned on the outer perimeter of the base of the adaptor that are configured to accept one or more fasteners to couple the adaptor to the electrical box have a width sufficient to receive a shank of a mounting screw but insufficient to permit passage therethrough of the mounting screw head.

In certain embodiments, the base of the adaptor comprises one or more openings positioned between the outer perimeter of the base and the second collar surface of the adaptor that are configured to accept one or more fasteners to couple the adaptor to an electrical box.

In certain embodiments, at least two slots on the outer perimeter of the base of the adaptor have different shapes, different sizes, different orientations, or combinations thereof. According to a certain embodiment, the adaptor comprises a first substantially horizontal slot positioned adjacent to a corner of the outer perimeter of the base and a second slot positioned in the opposite diagonal corner of the outer perimeter of the base having a diagonal orientation.

In certain embodiments, the collar of the adaptor extends away from the first base surface of the base. In certain embodiments, the collar extends away from the first base surface of the base for a distance of about a ¼ inch. In certain embodiments, the collar extends away from the first base surface of the base for a distance of about a ½ inch. In certain embodiments, the collar extends away from the first base surface of the base for a distance of about ⅝ inch. In certain embodiments, the collar extends away from the first base surface of the base for a distance of about ¾ inch. In certain embodiments, the collar extends away from the first base surface of the base for a distance of about 1 inch. In certain embodiments, the collar extends away from the first base surface of the base for a distance of about 1¼ inches. In certain embodiments, the collar extends away from the first base surface of the base for a distance of about 1½ inches. In certain embodiments, the collar extends away from the first base surface of the base for a distance of about 2 inches. In certain embodiments, the collar is flat and is in the same horizontal plane as the first base surface of the base.

In the present disclosure, the term "about" used in connection with a value is inclusive of the stated value and has the meaning dictated by the context. For example, the term "about" includes at least the degree of error associated with the measurement of the particular value. One of ordinary skill in the art would understand the term "about" is used herein to mean that an amount of "about" of a recited value results in the desired degree of effectiveness in the devices and/or methods of the present disclosure.

Also disclosed is a square electrical box assembly comprising i) an electrical box having a plurality of sides, a back portion, an open front portion, and an inner cavity, and ii) an adaptor configured to be coupled to the square electrical box, the adaptor comprising: a base having a first base surface, a second base surface, an outer perimeter, and an opening extending therethrough; a collar defining the opening on the base, wherein the collar has a first collar surface facing the opening and a second collar portion facing the first base surface of the base, wherein the collar comprises four substantially triangular tabs; wherein the first collar surface of the collar has a substantially octagonal dimension; and wherein the second collar surface of the collar has a substantially square dimension; wherein the outer perimeter of the base of the adaptor comprises one or more slots configured to accept one or more fasteners to couple the adaptor to the electrical box.

Also disclosed is a method for coupling an adaptor to a square electrical box in any orientation while still being compatible with the mounting pattern of an electrical device or fixture having a different configuration, wherein the method comprises: coupling the adapter to the electrical box by inserting a fastener into one or more openings on the base of the adaptor that is configured to accept one or more fasteners; wherein the adaptor comprises: a base having a first base surface, a second base surface, an outer perimeter, and an opening extending therethrough; a collar defining the opening on the base, wherein the collar has a first collar surface facing the opening and a second collar surface facing the first base surface of the base, wherein the collar comprises four substantially triangular tabs; wherein the first collar surface of the collar has a substantially octagonal dimension; and wherein the second collar surface of the collar has a substantially square dimension; wherein the outer perimeter of the base of the adaptor comprises one or more slots configured to accept one or more fasteners to couple the adaptor to the electrical box.

The disclosed adaptor is readily understood when read in conjunction with illustrative FIGS. 1-11. It should be noted that the adaptor is not limited to any of the illustrative embodiments shown in the figures, but rather should be construed in breadth and scope in accordance with the disclosure provided herein.

FIG. 1 is a front perspective view of an illustrative 4-inch square electrical box 10. Electrical box 10 comprises a plurality of sides 12, a back portion 14, an open front portion 16, and an inner cavity for housing electrical components.

Electrical box 10 further comprises two flanges 18 disposed in opposite diagonal corners configured to accommodate a fastener such as a screw.

Figure 2:
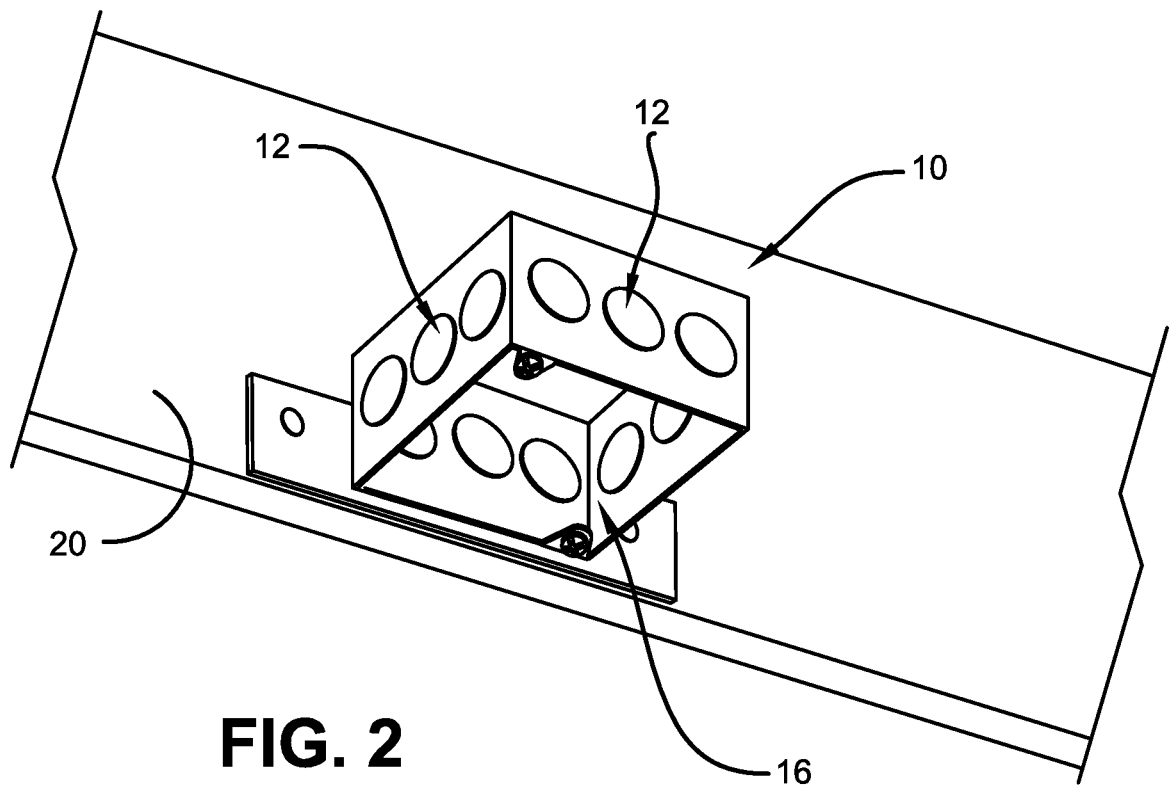
FIG. 2 is a schematic view of the 4-inch square electrical box shown in FIG. 1 that has been mounted to a ceiling joist.

FIG. 2 is a schematic view of the electrical box shown in FIG. 1 that has been mounted to a ceiling joist 20. Electrical box 10 comprises a plurality of sides 12, a back portion 14, an open front portion 16, and an inner cavity for housing electrical components. Electrical box 10 further comprises two flanges 18 disposed in opposite diagonal corners configured to accommodate a fastener such as a screw.

Figure 3:
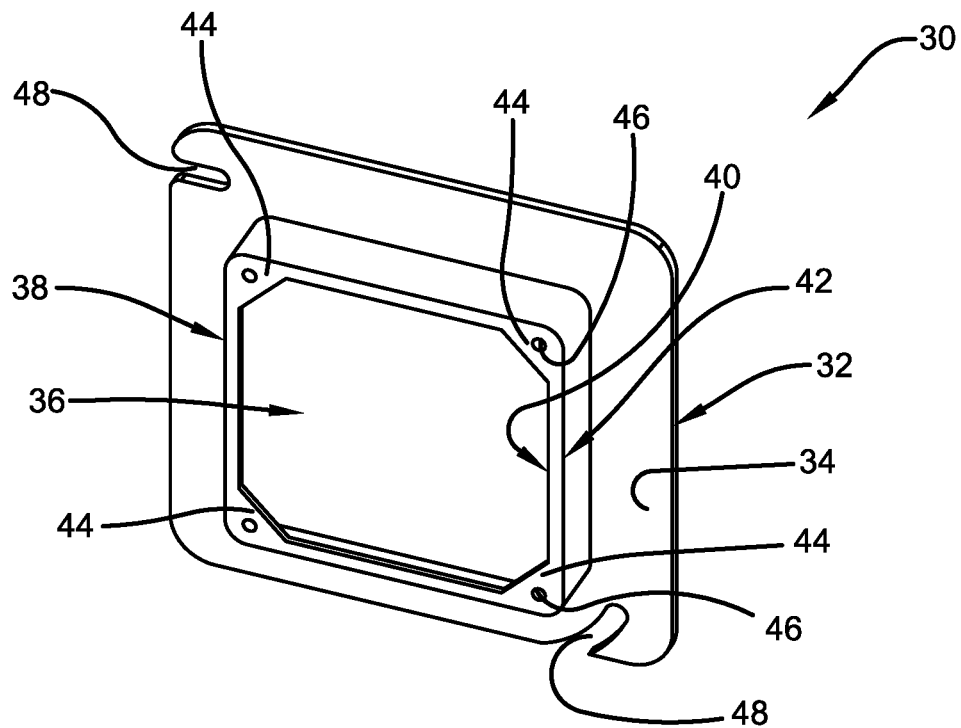
FIG. 3 is a front perspective view of an illustrative "square-to-square" adaptor having a 4"×4" square base and a raised collar having an approximately 3"×3" square shape with a triangular tab having an opening disposed therein in each corner, wherein the distance between the openings disposed in opposite diagonal triangular tabs of the collar is about 3½ inches, wherein the raised collar extends away from the first base surface of the base for a distance of about ⅝ inch.

FIG. 3 is a front perspective view of an illustrative adaptor 30 configured to be coupled to an electrical box (not shown). Adaptor 30 comprises a base 32 having a first base surface 34, a second base surface (not shown), and an opening 36 passing through the base. According to certain embodiments, opening 36 has an outer dimension of about 3 inches by about 3 inches. Adaptor 30 further comprises a collar 38 defining opening 36. Collar 38 has first collar surface 40 adjacent opening 36 and second collar surface 42 adjacent first base surface 34 of base 32. Collar 38 comprises four substantially triangular tabs 44. According to certain embodiments, each of the four substantially triangular tabs 44 has an opening 46 formed therein for receiving fastening elements (not shown) to couple adaptor 30 to an electrical device or fixture (not shown). The distance between the openings 46 disposed in opposite diagonal triangular tabs 44 of the collar 38 is about 3½ inches. First collar surface 40 of adaptor 30 has an octagonal dimension. Second collar surface 42 of adaptor 30 has a substantially square dimension. Collar 38 extends away from first base surface 34 of adaptor 30. According to certain embodiments, outer perimeter of base 32 has two slots 48 configured to accept one or more fasteners (not shown) to couple adaptor 30 to electrical box (not shown). Collar 38 may extend away from the first base surface 34 of base 32 for a distance of about ¼ inch to about 2 inches.

Figure 4:
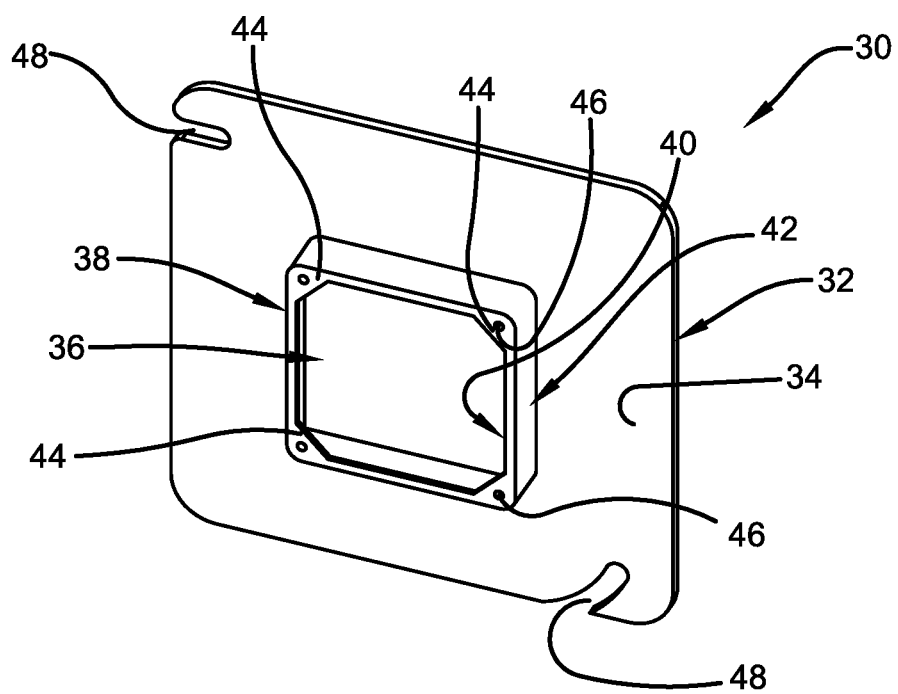
FIG. 4 is a front perspective view of an illustrative "square-to-square" adaptor having a 4"×4" square base and a raised collar having an approximately 2½"×2½" square shape with a triangular tab having an opening disposed therein in each corner, wherein the distance between the openings disposed in opposite diagonal triangular tabs of the collar is about 2¾ inches, wherein the raised collar extends away from the first base surface of the base for a distance of about ⅝ inch.

FIG. 4 is a front perspective view of an illustrative adaptor 30 configured to be coupled to an electrical box (not shown). Adaptor 30 comprises a base 32 having a first base surface 34, a second base surface (not shown), and an opening 36 passing through the base. According to certain embodiments, opening 36 has an outer dimension of about 2½ inches by about 2½ inches. Adaptor 30 further comprises a collar 38 defining opening 36. Collar 38 has first collar surface 40 adjacent opening 36 and second collar surface 42 adjacent first base surface 34 of base 32. Collar 38 comprises four substantially triangular tabs 44. According to certain embodiments, each of the four substantially triangular tabs 44 has an opening 46 formed therein for receiving fastening elements (not shown) to couple adaptor 30 to an electrical device or fixture (not shown). The distance between the openings 46 disposed in opposite diagonal triangular tabs 44 of the collar 38 is about 2¾ inches. First collar surface 40 of adaptor 30 has an octagonal dimension. Second collar surface 42 of adaptor 30 has a substantially square dimension. Collar 38 extends away from first base surface 34 of adaptor 30. According to certain embodiments, outer perimeter of base 32 has two slots 48 configured to accept one or more fasteners (not shown) to couple adaptor 30 to electrical box (not shown). Collar 38 may extend away from the first base surface 34 of base 32 for a distance of about ¼ inch to about 2 inches.

Figure 5:
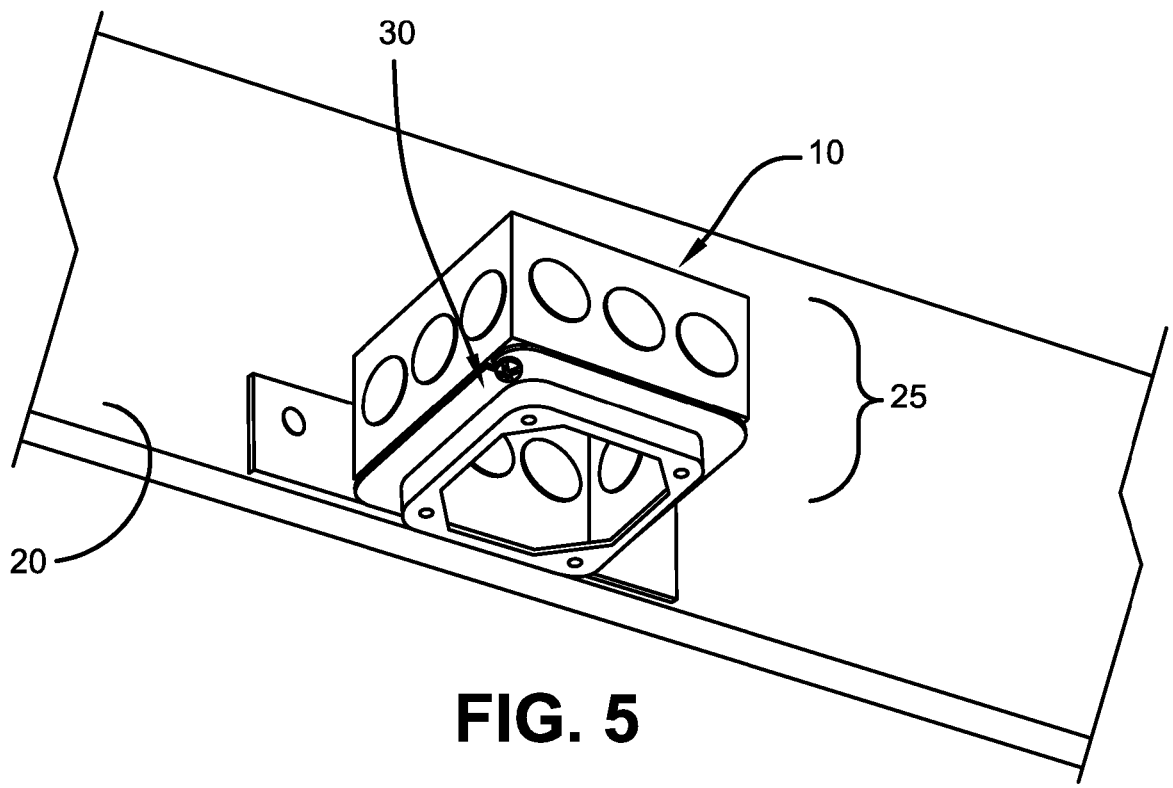
FIG. 5 is a schematic view of the electrical box shown in FIG. 1 that has been mounted to a ceiling joist, and wherein the illustrative adaptor shown in FIG. 3 has been coupled to the electrical box to form an electrical box assembly.

FIG. 5 is a schematic view of electrical box 10 mounted to ceiling joist 20 as shown in FIG. 2, wherein the illustrative adaptor shown in FIG. 3 is coupled to electrical box 10 by two fasteners inserted into slots on outer perimeter of base of adaptor 30. The coupling of adaptor 30 to electrical box 10 results in electrical box assembly 25.

Figure 6:
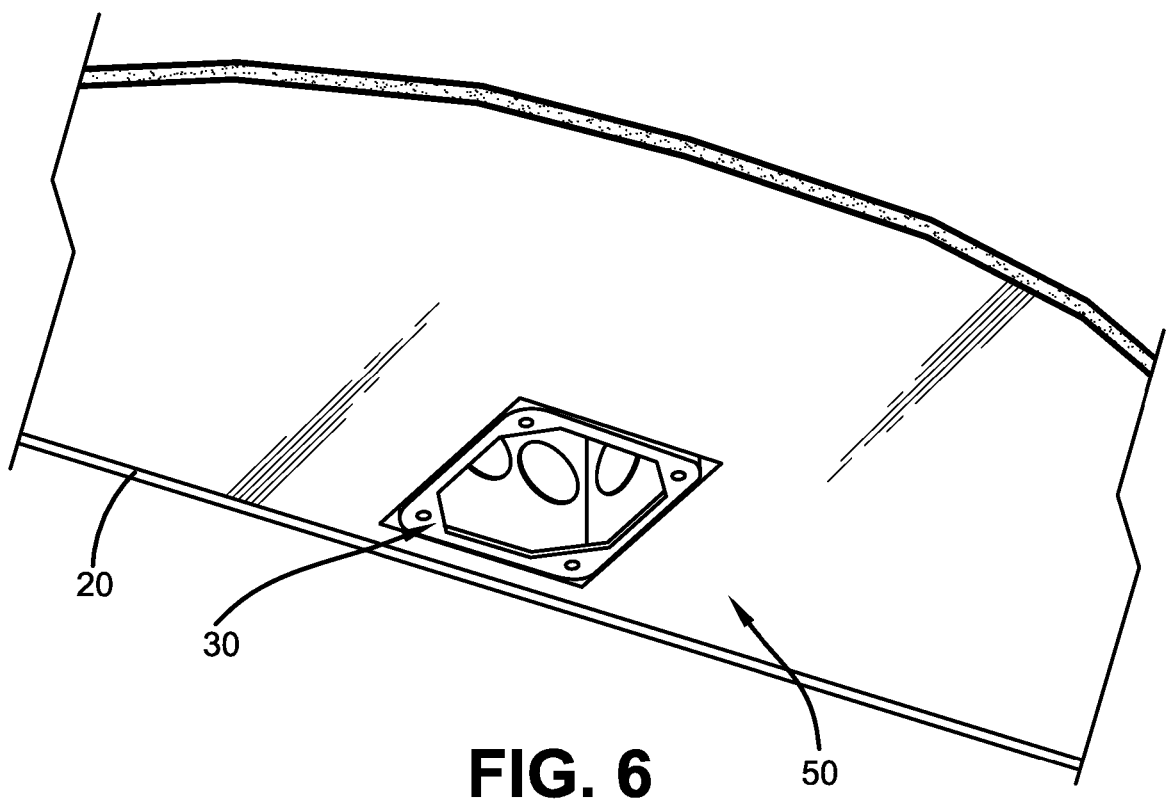
FIG. 6 is a schematic view of the electrical box assembly shown in FIG. 5, wherein a ceiling panel, such as drywall, is installed around the illustrative adaptor so that the outer face of the ceiling panel is substantially flush with the triangular tabs of the raised collar of the illustrative adaptor.

FIG. 6 is a schematic view showing ceiling panel 50 such as drywall is mounted to ceiling joist 20 and positioned around the illustrative adaptor 30 so that the outer face of the ceiling panel 50 is substantially flush with the triangular tabs of the raised collar of the illustrative adaptor 30.

Figure 7:
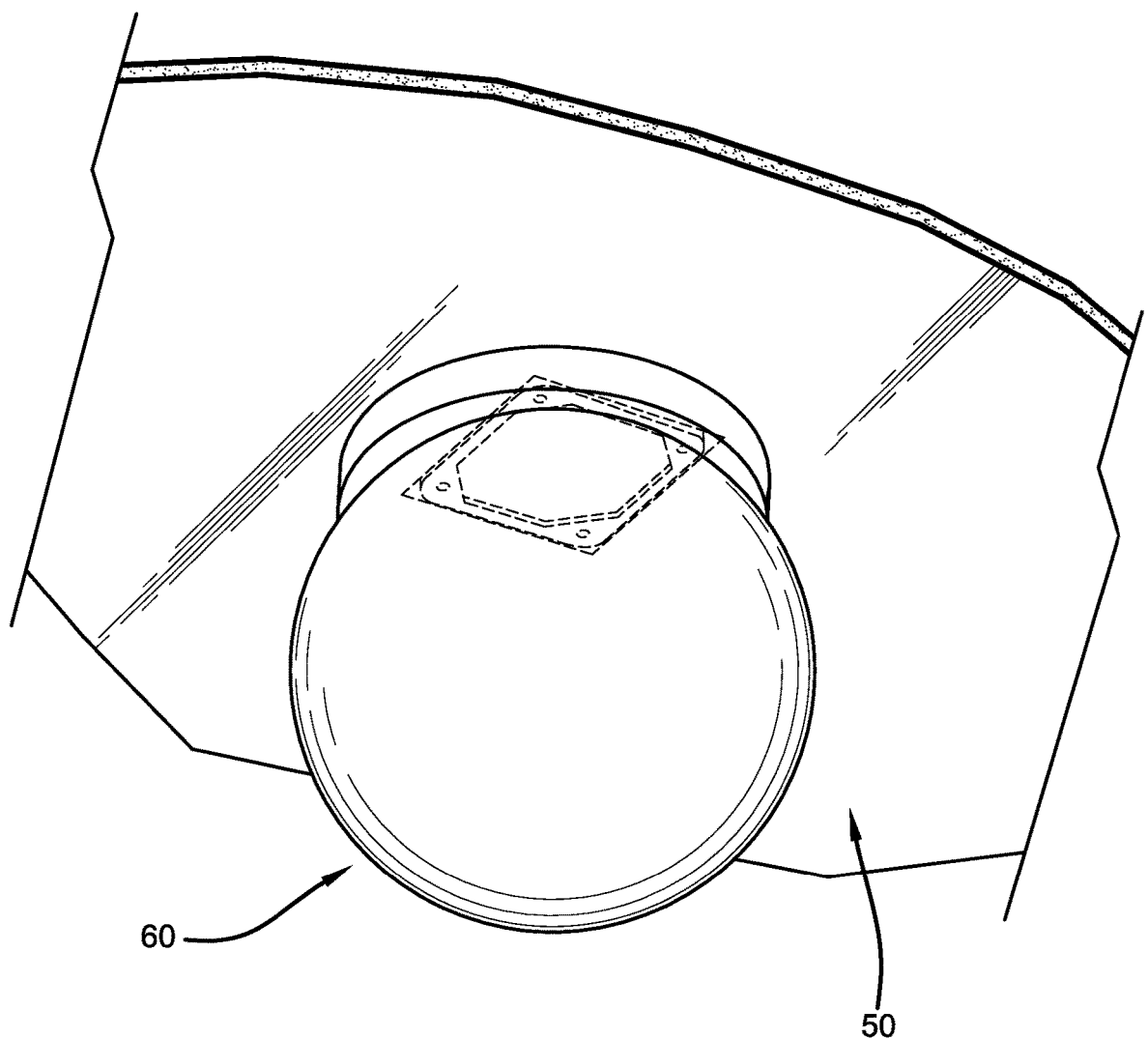
FIG. 7 is a schematic view of a light fixture mounted to the electrical box assembly shown in FIG. 6.

FIG. 7 is a schematic view showing light fixture 60 mounted to electrical box assembly shown in FIG. 6 so that the outer face of the ceiling panel 50 is substantially flush with the triangular tabs of the raised collar of the illustrative adaptor.

Figure 8:
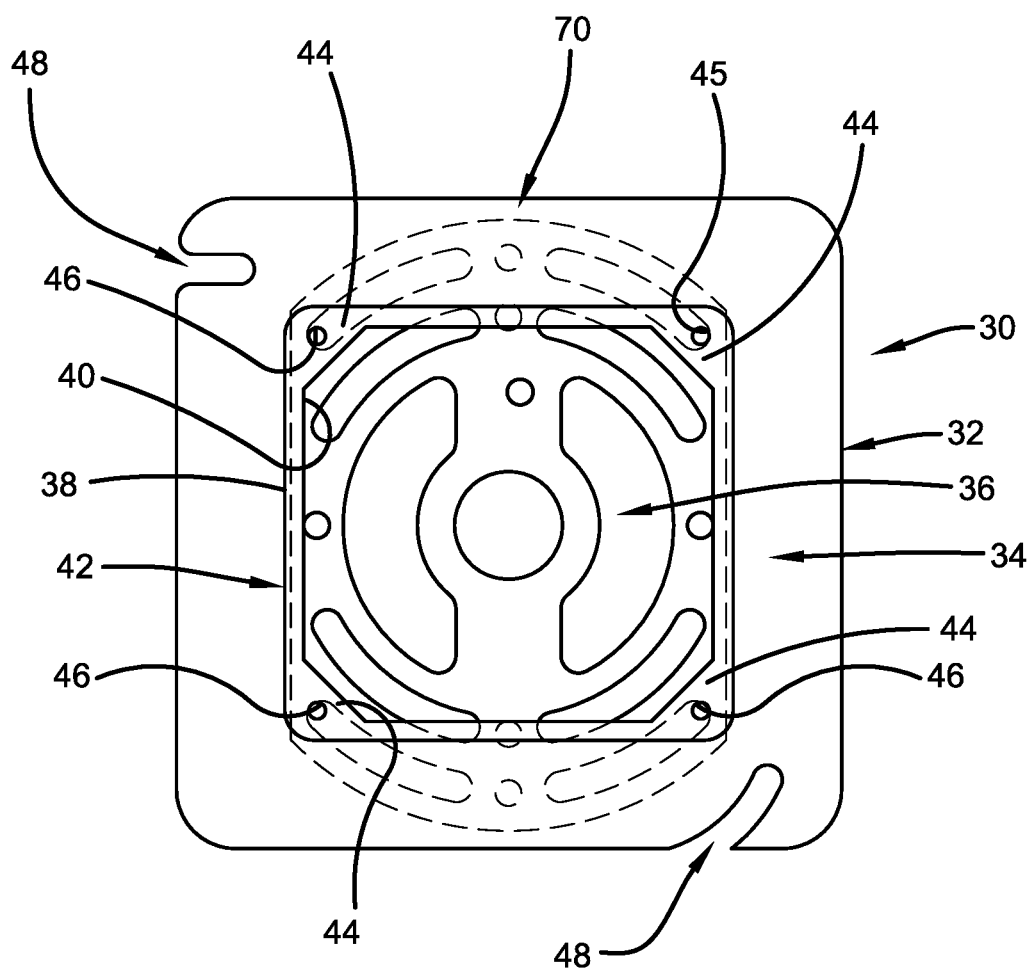
FIG. 8 is a schematic view of a conventional light fixture mounting hardware represented in dotted lines superimposed on top of an illustrative adaptor.

FIG. 8 is a schematic view of conventional light fixture mounting hardware 70 represented in dotted lines superimposed on top of an illustrative adaptor 30 configured to be coupled to an electrical box (not shown). Adaptor 30 comprises a base 32 having a first base surface 34, a second base surface (not shown), and an opening 36 passing through the base. According to certain embodiments, opening 36 has an outer dimension of about 3 inches by about 3 inches. Adaptor 30 further comprises a collar 38 defining opening 36. Collar 38 has first collar surface 40 adjacent opening 36 and second collar surface 42 adjacent first base surface 34 of base 32. Collar 38 comprises four substantially triangular tabs 44. According to certain embodiments, each of the four substantially triangular tabs 44 has an opening 46 formed therein for receiving fastening elements (not shown) to couple adaptor 30 to light fixture mounting hardware 70. The distance between the openings 46 disposed in opposite diagonal triangular tabs 44 of the collar 38 is about 3½ inches. First collar surface 40 of adaptor 30 has an octagonal dimension. Second collar surface 42 of adaptor 30 has a substantially square dimension. Collar 38 extends away from first base surface 34 of adaptor 30. According to certain embodiments, outer perimeter of base 32 has two slots 48 configured to accept one or more fasteners (not shown) to couple adaptor 30 to electrical box (not shown). Collar 38 may extend away from the first base surface 34 of base 32 for a distance of about ¼ inch to about 2 inches.

Figure 9:
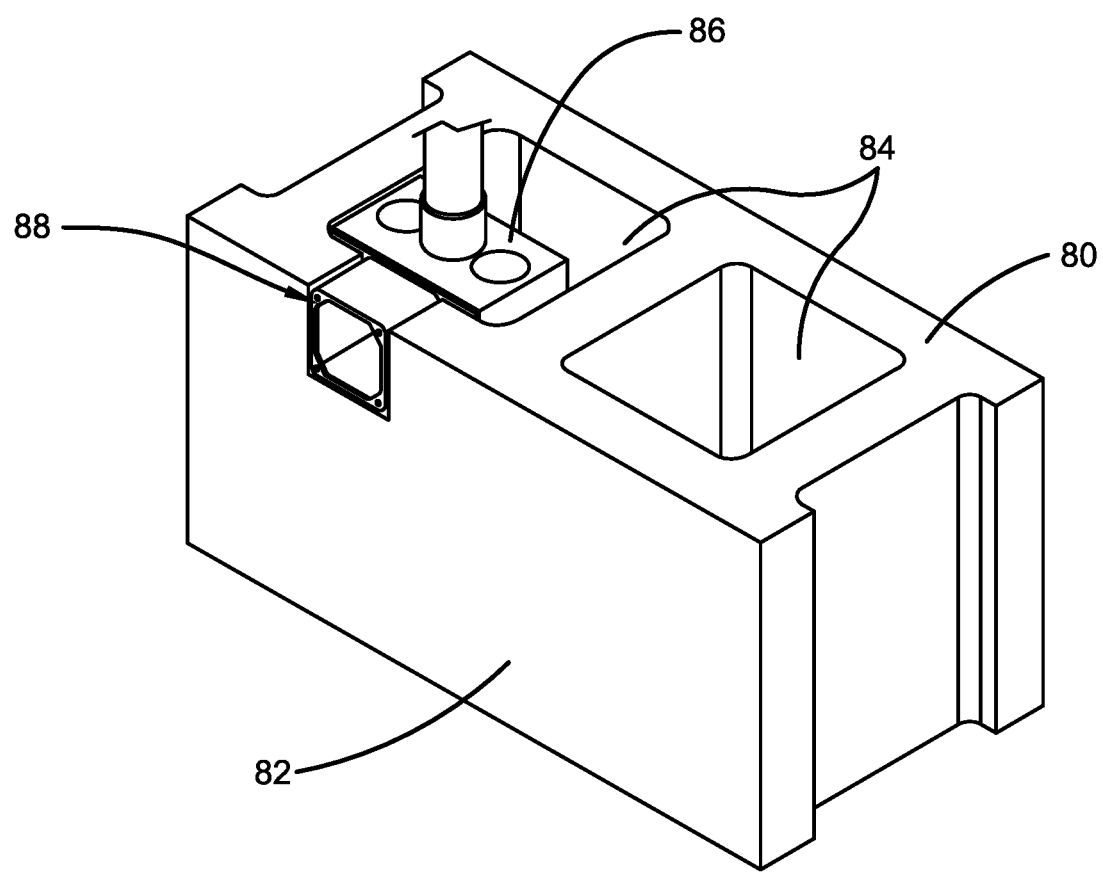
FIG. 9 is a schematic view of an illustrative electrical box assembly installed in a concrete block, wherein the outer face of the concrete block is substantially flush with the triangular tabs of the raised collar of the illustrative adaptor, wherein the raised collar extends away from the first base surface of the base of the adaptor for a distance of about 2 inches.

FIG. 9 is a schematic view of electrical box 86 coupled to an illustrative adaptor 88 installed in one of the inner openings 84 of concrete block 80 such that outer face 82 of concrete block 80 is substantially flush with the triangular tabs of the raised collar of the illustrative adaptor 88, wherein the raised collar extends away from the front base surface of the adaptor for a distance of about 2 inches.

Figure 10:
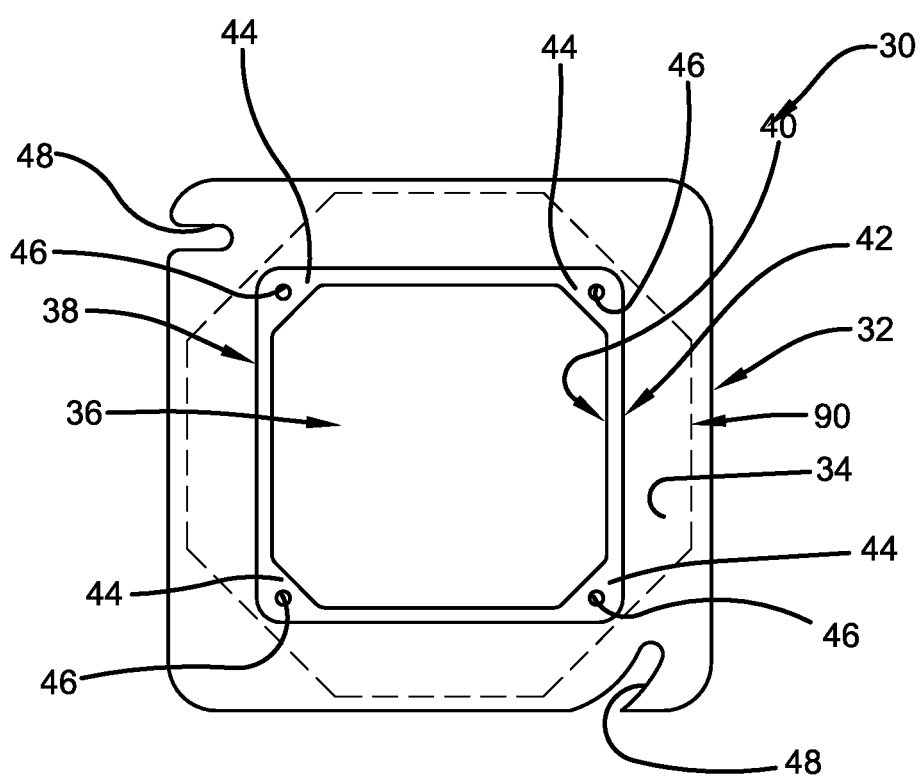
FIG. 10 is a schematic view of an octagonal shaped collar represented in dotted lines superimposed on top of an illustrative adaptor having a substantially square shaped collar.

FIG. 10 is a schematic view of larger octagonal shaped collar 90 represented in dotted lines superimposed on top of illustrative smaller square shaped second collar surface 40 of adaptor 30. Adaptor 30 comprises a base 32 having a first base surface 34, a second base surface (not shown), and an opening 36 passing through the base. According to certain embodiments, opening 36 has an outer dimension of about 3 inches by about 3 inches. Adaptor 30 further comprises a collar 38 defining opening 36. Collar 38 has first collar surface 40 adjacent opening 36 and second collar surface 42 adjacent first base surface 34 of base 32. Collar 38 comprises four substantially triangular tabs 44. According to certain embodiments, each of the four substantially triangular tabs 44 has an opening 46 formed therein for receiving fastening elements (not shown) to couple adaptor 30 to an electrical device or fixture (not shown). The distance between the openings 46 disposed in opposite diagonal triangular tabs 44 of the collar 38 is about 3½ inches. First collar surface 40 of adaptor 30 has an octagonal dimension. Second collar surface 42 of adaptor 30 has a substantially square dimension. Collar 38 extends away from first base surface 34 of adaptor 30. According to certain embodiments, outer perimeter of base 32 has two slots 48 configured to accept one or more fasteners (not shown) to couple adaptor 30 to electrical box (not shown). Collar 38 may extend away from the first base surface 34 of base 32 for a distance of about ¼ inch to about 2 inches. Smaller square shaped second collar surface 40 is easier and faster to cut, as compared to larger octagonal shaped collar 90 represented in dotted lines. Smaller square shaped second collar surface 40 permits a snug fit between collar 38 of adaptor 30 and the finished surface, such as drywall or concrete block, with minimal or no gaps or openings that would otherwise require patching.

Figure 11:
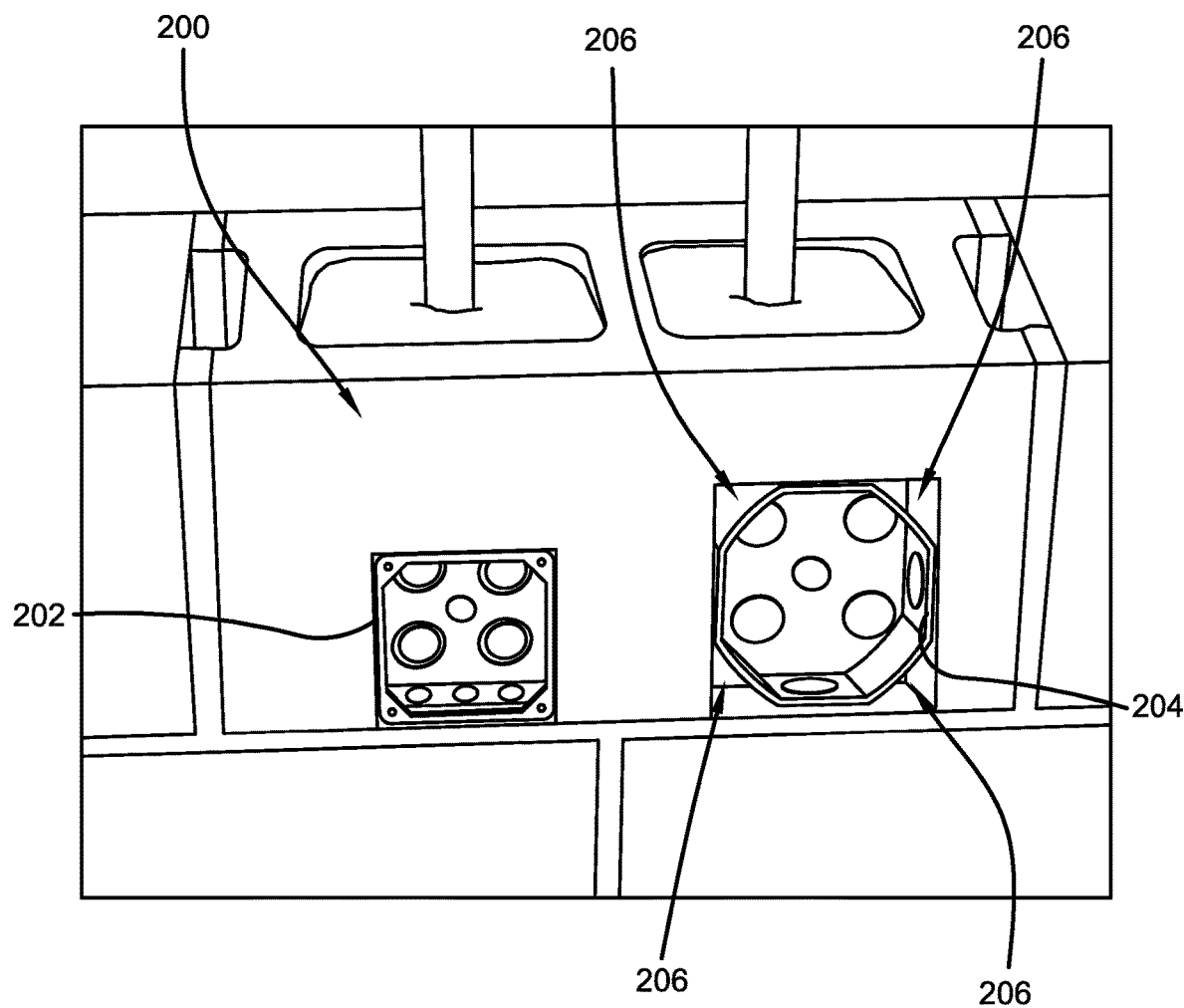
FIG. 11 is a schematic view of a side-by-side comparison of an illustrative adaptor having a substantially square shaped collar (left) to an adaptor having an octagon shaped collar which requires the removal of a larger cut-out and also creates large gaps or openings that require patching, wherein the raised collar on both the substantially square shaped collar (left) and the octagon shaped collar (right) extends away from the first base surface of the base for a distance of about 2 inches.

FIG. 11 is a schematic view of a side-by-side comparison of an illustrative adaptor having square shaped second collar surface (left) 202, as compared to an octagon shaped collar 204 requiring a larger cut-out and large gaps 206 that require patching, wherein the raised collar on both the substantially square shaped collar (left) and the octagon shaped collar (right) extends away from the first base surface of the base for a distance of about 2 inches.

While the adaptor for a square electrical box, electrical box assembly, and methods for affixing an adaptor to a square electrical box have been disclosed according to certain embodiments, it is to be understood that other similar embodiments may be used or modifications and additions may be made to the described embodiments for performing the same function. Furthermore, the various illustrative embodiments may be combined to produce the desired results. Therefore, the present disclosure should not be limited to any single embodiment.

The invention claimed is:

1. An adaptor configured to be coupled to a square electrical box, the adaptor comprising:
    a base having a first base surface, a second base surface, an outer perimeter, and an opening;
    a collar defining the opening on the base, wherein the collar has a first collar surface facing the opening and a second collar surface facing the first base surface of the base, wherein the collar comprises four substantially triangular tabs, wherein at least one of the substantially triangular tabs comprises at least one opening formed therein for receiving a fastening element configured to couple the adaptor to an electrical device or fixture mounting hardware;
    wherein the first collar surface of the collar defines an octagonal dimension;
    wherein the second collar surface of the collar defines a substantially square dimension; and
    wherein the adaptor is a single unitary member.

2. The adaptor of claim 1, wherein each of the four substantially triangular tabs on the collar comprises at least one opening formed therein for receiving fastening elements to couple the adaptor to an electrical device or fixture.

3. The adaptor of claim 2, wherein the second collar surface of the collar has a dimension of about 3 inches by about 3 inches, and wherein the distance between the openings disposed in opposite diagonal triangular tabs of the collar is about 3½ inches.

4. The adaptor of claim 2, wherein the second collar surface of the collar has a dimension of 2½ inches by 2½ inches, and wherein the distance between the openings disposed in opposite diagonal triangular tabs of the collar is about 2¾ inches.

5. The adaptor of claim 1, wherein the outer perimeter of the base comprises one or more slots configured to accept one or more fasteners to couple the adaptor to the electrical box.

6. The adaptor of claim 5, wherein the outer perimeter of the base comprises at least two slots configured to accept one or more fasteners to couple the adaptor to the electrical box.

7. The adaptor of claim 6, wherein the at least two slots have different shapes, different sizes, different orientations, or combinations thereof.

8. The adaptor of claim 5, wherein the outer perimeter of the base comprises at least three slots configured to accept one or more fasteners to couple the adaptor to the electrical box.

9. The adaptor of claim 5, wherein the outer perimeter of the base comprises at least four slots configured to accept one or more fasteners to couple the adaptor to the electrical box.

10. The adaptor of claim 5, wherein the one or more slots have a width sufficient to receive a shank of a mounting screw but insufficient to permit passage therethrough of a mounting screw head.

11. The adaptor of claim 1, wherein the collar extends away from the first base surface of the base.

12. The adaptor of claim 11, wherein the collar extends away from the first base surface of the base for a distance of about ¼ inch to about 2 inches.

13. The adaptor of claim 1, wherein the base has an outer dimension of 4 inches by 4 inches.

14. The adaptor of claim 1, wherein the base has an outer dimension of 4¹¹⁄₁₆ inches by 4¹¹⁄₁₆ inches.

15. The adaptor of claim 1, wherein the openings formed on the triangular tabs of the collar have an 8-32 thread.

16. The adaptor of claim 1, wherein the adaptor is configured to be coupled to a light fixture.

17. The adaptor of claim 1, wherein the base has an outer dimension of 4 inches by 4 inches, and the second collar surface of the collar has a dimension of about 3 inches by about 3 inches.

* * * * *